(12) United States Patent
Yang et al.

(10) Patent No.: US 11,962,117 B2
(45) Date of Patent: Apr. 16, 2024

(54) FIBER LASER LIGHT COHERENT COMBINATION SYSTEM

(71) Applicant: China South Industry Academy, Beijing (CN)

(72) Inventors: Zhen Yang, Beijing (CN); Junfeng Shi, Beijing (CN); Ye Li, Beijing (CN); Xinpeng Sun, Beijing (CN); Lin Xu, Beijing (CN); Chaoyang Li, Beijing (CN); Qingsong Li, Beijing (CN)

(73) Assignee: China South Industry Academy, Beijing (CN)

( * ) Notice: Subject to any disclaimer, the term of this patent is extended or adjusted under 35 U.S.C. 154(b) by 666 days.

(21) Appl. No.: 17/127,243

(22) Filed: Dec. 18, 2020

(65) Prior Publication Data

US 2021/0194200 A1 Jun. 24, 2021

(30) Foreign Application Priority Data

Dec. 19, 2019 (CN) .......................... 201911315624.1

(51) Int. Cl.
*H01S 3/00* (2006.01)
*G02B 27/30* (2006.01)
(Continued)

(52) U.S. Cl.
CPC ............ *H01S 3/0085* (2013.01); *G02B 27/30* (2013.01); *G02F 1/0121* (2013.01); *G02F 1/11* (2013.01);
(Continued)

(58) Field of Classification Search
CPC ... G02B 27/0905; G02B 27/30; G02F 1/0121; G02F 1/11; G02F 2/00; G02F 2203/50;
(Continued)

(56) References Cited

U.S. PATENT DOCUMENTS

| 6,115,125 | A | 9/2000 | Tazartes et al. |
| 2017/0343750 | A1* | 11/2017 | Ashrafi .................. H04J 14/04 |
| 2020/0350737 | A1* | 11/2020 | Beresnev .............. H01S 3/2383 |

FOREIGN PATENT DOCUMENTS

| CN | 106972893 | 7/2017 |
| CN | 107135065 | 9/2017 |

(Continued)

OTHER PUBLICATIONS

Office Action issued in counterpart Chinese Patent Application No. 201911315624.1, dated Aug. 5, 2020, 13 pages with translation.
(Continued)

*Primary Examiner* — Joseph P Martinez
*Assistant Examiner* — Vipin Patel
(74) *Attorney, Agent, or Firm* — HSML P.C.

(57) ABSTRACT

The present disclosure provides a fiber laser light coherent combination system, comprising: a modulator module configured to perform a phase modulation on sub-beams according to pseudo-random sequences orthogonally independent from each other, and perform a frequency shift on a reference beam according to a set frequency; a fiber laser light amplifier module configured to perform a power amplification on the modulated sub-beams; a laser light collimation emission module configured to collimate and output the sub-beams and the reference beam; a combination sampling module configured to perform a combination of the sub-beams and the reference beam which are collimated and outputted, and convert them into an electrical signal; a digital phase modulation and demodulation module configured to perform a demodulation on the electrical signal according to the shifted frequency and each of the pseudo-random sequences, and obtain a phase difference between each of the sub-beams and the reference beam.

9 Claims, 3 Drawing Sheets

(51) Int. Cl.
  *G02F 1/01*   (2006.01)
  *G02F 1/11*   (2006.01)
  *G02F 2/00*   (2006.01)
  *H01S 3/067*  (2006.01)
  *H01S 3/23*   (2006.01)

(52) U.S. Cl.
  CPC ............ *G02F 2/00* (2013.01); *H01S 3/06758* (2013.01); *H01S 3/2308* (2013.01); *G02F 2203/50* (2013.01)

(58) Field of Classification Search
  CPC ............... H01S 3/0085; H01S 3/06754; H01S 3/06758; H01S 3/10069; H01S 3/1305; H01S 3/1307; H01S 3/2308; H01S 3/2383
  See application file for complete search history.

(56) References Cited

FOREIGN PATENT DOCUMENTS

| CN | 107181160 A | * | 9/2017 |
|----|-------------|---|--------|
| CN | 109212772   |   | 1/2019 |
| WO | 2012/035304 |   | 3/2012 |

OTHER PUBLICATIONS

Search Report issued in counterpart Chinese Patent Application No. 201911315624.1, dated Aug. 5, 2020, 4 pages with translation.
Bourdon, et al., "Coherent Combining Fiber Lasers", Proc. of SPIE, vol. 10254, Jan. 27, 2017, 10 pages.

* cited by examiner

FIBER LASER LIGHT COHERENT COMBINATION SYSTEM

CROSS-REFERENCE TO RELATED APPLICATION

This application claims priority to Chinese Patent Application No. 201911315624.1, filed on Dec. 19, 2019, which is hereby incorporated by reference in its entirety.

TECHNICAL FIELD

The present disclosure belongs to the field of laser light technologies, and particularly to a fiber laser light coherent combination system.

BACKGROUND ART

The high-power fiber laser has the advantages of high power density, good beam quality, convenient thermal management, compact structure, etc., and has achieved a rapid development in recent years. Compared with the traditional solid-state and chemical lasers, the fiber laser has a simple structure with the advantages of easy manufacturing and maintenance, so it is widely used in remote welding, three-dimensional cutting and other industrial fields, and also has a good application potential in national defense and modern high-tech fields. However, due to the thermal effect, non-linear effect, pumping technology, mode instability and other factors of the fiber itself, the output power of a single-path fiber laser is limited.

In the prior art, through a multi-path active phase-locked coherent combination technology, a laser light output of higher power can be achieved on the basis of overcoming the output power limit of the single-path fiber laser. A heterodyne method, a stochastic parallel gradient descent method and a frequency domain multi jitter method are mostly used in the active phase-locked coherent combination technology. In the heterodyne method, when the number of sub-beams increases, it is necessary to provide detectors and demodulation circuits of a same number as the sub-beams, in order to detect and compensate for a phase difference of each of the sub-beams. The number of devices and the connection complexity of the whole system increase greatly, and the adjustment is difficult. Meanwhile, due to a hardware difference between the detectors and the demodulation circuits, the phase difference of each of the sub-beams detected by those detectors and demodulation circuits is inaccurate and cannot be adjusted by phase compensation, so that each of the sub-beams cannot be coherently combined or the effect is poor.

SUMMARY OF THE DISCLOSURE

In view of the disadvantages of the prior art, the present disclosure provides a fiber laser light coherent combination system to solve the following problem: the number of sub-beams increases in a procedure of a fiber laser light coherent combination, which leads to too many detectors and demodulation circuits, thereby causing a poor combination effect.

The present disclosure adopts the following solutions to solve the technical problem.

In an aspect, there is provided a fiber laser light coherent combination system, comprising:

a modulator module configured to receive a plurality of sub-beams and a reference beam split from a beam, perform a phase modulation on corresponding sub-beams according to pseudo-random sequences, and perform a frequency shift on the reference beam according to a set frequency, wherein each of the sub-beams is corresponding to one of the pseudo-random sequences, the pseudo-random sequences are orthogonally independent from each other, and a 2m-th item and a (2m−1)-th item in each of the pseudo-random sequences have different values, wherein m is a positive integer;

a fiber laser light amplifier module configured to perform a power amplification on the plurality of sub-beams after the phase modulation;

a laser light collimation emission module configured to collimate and output the reference beam after the frequency shift and the plurality of sub-beams after the power amplification;

a combination sampling module configured to perform a coherent combination of all of the sub-beams and the reference beam which are collimated and outputted, and convert signal light obtained by the coherent combination into an electrical signal; and a digital phase modulation and demodulation module configured to receive the electrical signal, perform a phase demodulation on the electrical signal according to the set frequency and each of the pseudo-random sequences, obtain a phase difference between each of the sub-beams and the reference beam, and output a phase compensation control signal; and the modulator module is further configured to perform a phase compensation and locking on each of the sub-beams according to the phase compensation control signal, so that a coherence enhancement occurs during the coherent combination of all of the sub-beams in the combination sampling module.

In some embodiments, the modulator module comprises:

a signal source configured to generate a modulation signal of the set frequency;

an acousto-optic modulator configured to perform a frequency shift on the reference beam according to the modulation signal; and a plurality of phase modulators configured to perform a phase modulation on the corresponding sub-beams according to the pseudo-random sequences, and perform phase locking on each of the sub-beams according to the phase compensation control signal.

In some embodiments, the phase modulator is an electro-optic phase modulator or an acousto-optic phase modulator.

In some embodiments, the digital phase modulation and demodulation module further comprises an FPGA digital control circuit configured to generate and output each of the pseudo-random sequences to the modulator module.

In some embodiments, the fiber laser light amplifier module comprises a plurality of fiber laser amplifiers each performing a power amplification on one of the sub-beams after the phase modulation.

In some embodiments, the combination sampling module comprises:

a spectroscope configured to receive all of the sub-beams and the reference beam which are collimated and outputted, and take one of the sub-beams for an interference combination with the reference beam;

a sampling focusing mirror provided at one side of the spectroscope and configured to focus an interference-combined beam;

an attenuation component configured to attenuate power of the focused beam to be less than a detection threshold of the photodetector; and the photodetector configured to convert the power-attenuated beam into an electrical signal.

In some embodiments, the spectroscope is further configured to take another one from all of the sub-beams which are collimated and outputted for a laser power detection.

In some embodiments, the laser light collimation emission module comprises:

a collimator configured to collimate and output each of the sub-beams after the power amplification; and a fiber end cap configured to collimate and output the reference beam after the frequency shift.

In some embodiments, the system further comprises a laser light seed source module; and the laser light seed source module comprises:

a laser light seed source configured to generate a laser light beam; and a fiber beam splitter configured to split the laser light beam into the plurality of sub-beams and the one reference beam.

In some embodiments, the digital phase modulation and demodulation module is configured to filter out a frequency shift signal of the reference beam in the electrical signal according to the set frequency, multiply the resultant electrical signal by a pseudo-random sequence corresponding to each of the sub-beams, sum a multiplication result corresponding to each of the sub-beams within a period of the corresponding pseudo-random sequence, normalize a summation result corresponding to each of the sub-beams to obtain a cosine value of the phase difference between the corresponding sub-beam and the reference beam, and calculate an arc cosine of the cosine value of the phase difference between each of the sub-beams and the reference beam to obtain the phase difference between the corresponding sub-beam and the reference beam.

In the fiber laser light coherent combination system according to the present disclosure, the sub-beams are respectively modulated by the modulator module with a plurality of pseudo-random sequences which are orthogonally independent from each other and have a same phase difference, and the electric signal acquired by the photodetector is multiplied by the pseudo-random sequence corresponding to each of the sub-beams for a demodulation, so that the phase difference between each of the sub-beams and the reference beam can be detected once, which overcomes the defect that the heterodyne method needs to detect the sub-beams respectively, and solves the problem that that the photodetectors and the demodulation circuits are too numerous when a coherent combination is performed on the plurality of sub-beams in the heterodyne method. Meanwhile, it avoids the inconsistency between calculation standards for the phase difference caused by the precision difference between the detection devices during multi-path detection, achieves a more accurate phase compensation for the sub-beams, and improves the effect of coherent combination.

BRIEF DESCRIPTION OF THE DRAWINGS

The above and other objectives, characteristics and advantages of the present disclosure will be more easily understood with reference to the following description of the embodiments of the present disclosure made in conjunction with the drawings. Components in the drawings are not drawn to scale, but are only for the purpose of illustrating the principle of the present disclosure. For the convenience of illustrating and describing some parts of the present disclosure, corresponding parts in the drawings may be enlarged, i.e., may become larger relative to other components in an exemplary device actually manufactured according to the present disclosure. In the drawings, the same or corresponding technical features or components will be denoted with the same or corresponding reference numerals.

DETAILED DESCRIPTION OF THE PREFERRED EMBODIMENTS

Figure 1:
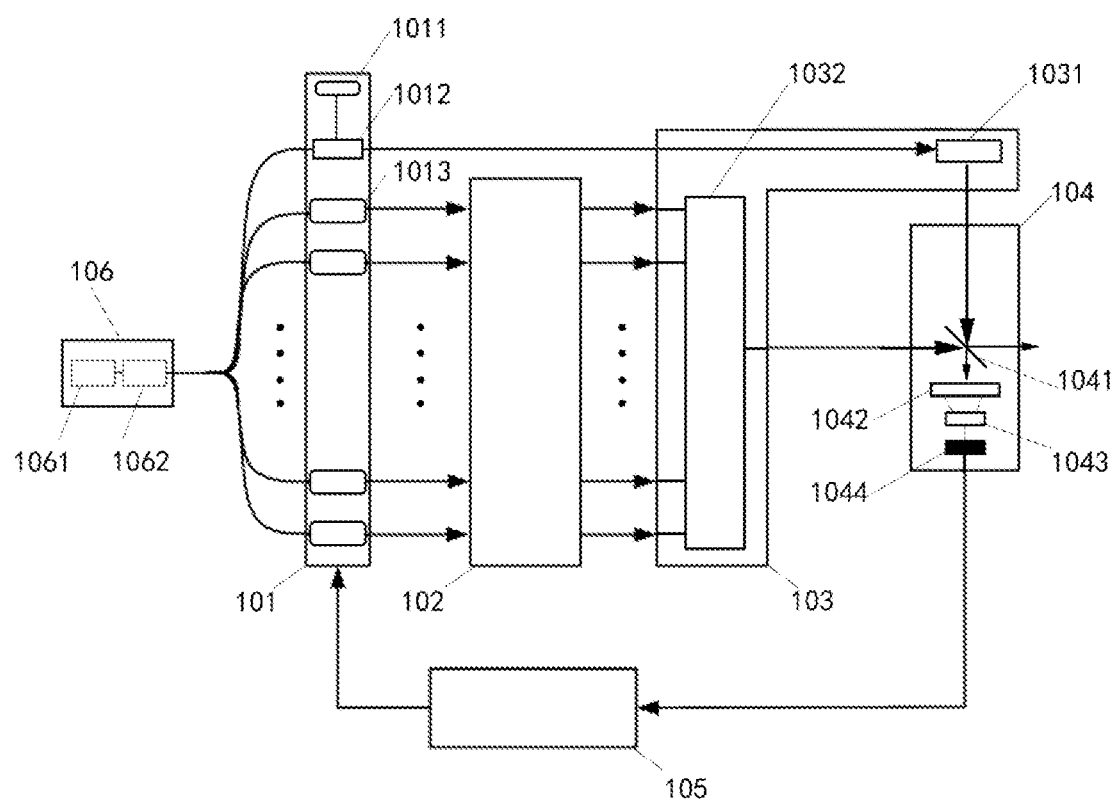
FIG. 1 is a schematic structural diagram of a fiber laser light coherent combination system according to an embodiment of the present disclosure.

The embodiments of the present disclosure will be described below with reference to the drawings. In the descriptions and drawings, particular embodiments of the present disclosure are disclosed in detail to indicate the ways in which the principle of the present disclosure can be adopted. It should be understood that the scope of the present disclosure is not limited thereto. Within the scope of the spirit and clauses of the appended claims, the present disclosure includes many changes, modifications and equivalents.

It should be noted that in order for clarity, representations and descriptions of components and processes which are not related to the present disclosure and are known to those of ordinary skill in the art are omitted from the drawings and description.

Features described and/or illustrated for one embodiment may be used in one or more other embodiments in the same or similar way, may be combined with features in other embodiments, or may take place of those features.

It should be emphasized that the term 'include/comprise' used herein refers to the presence of features, elements, steps or components, but does not exclude the presence or addition of one or more other features, elements, steps or components.

In the prior art, laser light is widely used in remote welding, three-dimensional cutting and other industrial fields, and has a good application potential in national defense and modern high-tech fields. In actual use, the laser light is required to reach high power in some scenes, and the modulation of the power of the laser light by the fiber laser is limited by the thermal effect, nonlinear effect, pumping technology, mode instability and other factors of the fiber itself, so that the output power of the single-path fiber laser is limited.

Thus, in the prior art, the multi-path active phase-locked coherent combination technology is adopted to overcome the limiting factors of the single-path fiber laser and realize a power output of higher power and higher brightness. Due to the influence such as the internal temperature fluctuation of the fiber amplifier, the output beam has phase noise. Thus, the key step of the multi-path active phase-locked coherent combination technology is to adjust the phase of each of the sub-beams to meet the coherent conditions. In the prior art, there are three ways to adjust the phase of each of the sub-beams, i.e., a heterodyne method, a stochastic parallel gradient descent (SPGD) method and a frequency domain multi jitter method. In which, the problem of the stochastic parallel gradient descent method is that the bandwidth of this control method is inversely proportional to the 4/3 power of the number N of the sub-beams, and when the sampling frequency is fixed, the control bandwidth decreases with the increase of the number of paths. The disadvantage of the frequency-domain multi jitter method is that when the number of the sub-beams increases, in order to effectively control the phase fluctuation, the frequency of the phase modulation signal must also increase, which causes the phase control bandwidth to be higher than the fluctuation frequency of the phase noise, thereby increasing the actual operation risk of the circuit and making the implementation be difficult. For the heterodyne method, when the number of the sub-beams increases, it is necessary to configure the photodetectors and the demodulation circuits of a same number as the signal light to detect the phase difference between each of the sub-beams and the reference beam, which will greatly increase the complexity of the whole system and make it difficult for adjustment.

Aiming at the defect that photodetectors and demodulation circuits need to be respectively configured when each of the sub-beams is adjusted for a phase compensation and locking by the heterodyne method in the multi-path active phase-locked coherent combination technology, the present disclosure uses pseudo-random sequences to modulate each of the sub-beams in advance, demodulate electrical signals detected by the photodetectors in conjunction with corresponding pseudo-random sequences, and detect the phase difference between a plurality of sub-beams and the reference beam by a group of photodetectors and demodulation circuits.

As illustrated in FIG. 1, the present disclosure provides a fiber laser light coherent combination system, which may comprise a modulator module 101, a fiber laser light amplifier module 102, a laser light collimation emission module 103, a combination sampling module 104 and a digital phase modulation and demodulation module 105.

The modulator module 101 is configured to receive a plurality of sub-beams and a reference beam split from a beam, perform a phase modulation on corresponding sub-beams according to pseudo-random sequences, and perform a frequency shift on the reference beam according to a set frequency, wherein each of the sub-beams is corresponding to one of the pseudo-random sequences, the pseudo-random sequences are orthogonally independent from each other, and a 2m-th item and a (2m−1)-th item in each of the pseudo-random sequences have different values, wherein m is a positive integer. Specifically, the modulator module 101 uses the orthogonal pseudo-random sequences to modulate each of the sub-beams, which can suppress and eliminate the influence of other sub-beams by using a property that a correlation coefficient between the pseudo-random sequences is zero, when the phase difference between a certain sub-beam and the reference beam is calculated in the subsequent demodulation procedure in conjunction with the pseudo-random sequences. Meanwhile, by making the 2m-th item and the (2m−1)-th item in each of the pseudo-random sequences have different values (i.e., the adjacent odd and even items in a pseudo-random sequence are different from each other), a certain sub-beam which is currently being demodulated is irrelevant to information of combined light of any other two sub-beams when each of the sub-beams is demodulated, so that information of the currently being demodulated sub-beam will not be influenced by combination information of any other two sub-beams. Further, in order to improve the detection effect, it may be set that an average value of the items in each of the pseudo-random sequences is 0.5, and each of the pseudo-random sequences has an equal variance.

In some embodiments, the fiber laser light coherent combination system may further comprise a laser light seed source module 106 configured to generate a seed light source and split the seed light source into a reference beam and a plurality of sub-beams. The laser light seed source module 106 may comprise a laser light seed source 1061 and a fiber beam splitter 1062. The laser light seed source 1061 may adopt a laser light seed source with a pigtail output for introducing a generated seed light source into the fiber beam splitter 1062. The type of the laser light seed source 1061 may comprise a fixed laser, a semiconductor laser or a fiber laser, and other devices capable of generating or transmitting laser light may also be adopted. Further, the laser light seed source 1061 may be a continuous laser light seed source or a pulsed laser light seed source. The fiber beam splitter 1062 may adopt an all-fiber beam splitter, and split the seed light source generated by the laser light seed source 1061 into N sub-beams according to the use requirements in specific scenes. Further, according to the requirements of the heterodyne method, the sub-beams generated by beam splitting are divided into two groups, wherein one group comprises one sub-beam as the reference beam, and the other group comprises the remaining N−1 sub-beams for the power amplification and the coherent combination, and wherein N is a positive integer.

Specifically, the modulator module 101 may pre-store pseudo-random sequences of a same number as the sub-beams, or receive eligible pseudo-random sequences generated by a pseudo-random sequence generator in the digital phase modulation and demodulation module 105. For example, the digital phase modulation and demodulation module 105 may comprise a digital control circuit of a Field Programmable Gate Array (FPGA) for generating a plurality of pseudo-random sequences that meet the aforementioned requirements.

In the embodiment of the present disclosure, in order to detect a phase difference between a plurality of sub-beams and a reference beam by one photodetector and demodulation circuit, the sub-beams are modulated with the pseudo-random sequences of a same number as the sub-beams, and after the sub-beams are combined, the photoelectric detector is adopted to detect electrical signals of the combined beam, and the electrical signals are demodulated in conjunction with the corresponding pseudo-random sequences, respectively, thereby realizing the detection of the phase difference between each of the sub-beams and the reference beam.

Specifically, in some embodiments, the modulator module 101 may comprise a signal source 1011, an acousto-optic modulator 1012, and a plurality of phase modulators 1013 of a same number as the sub-beams, wherein the acousto-optic modulator 1012 may be configured to receive a reference beam generated by the laser light seed source module 101, and perform a frequency shift on the reference beam according to a modulation signal of a set frequency generated by the signal source 1011. Further, the signal source 1011 may be a vector signal generator. Each of the phase modulators 1013 is configured to receive one of the sub-beams, and each of the phase modulators 1013 may modulate a corresponding sub-beam according to a pseudo-random sequence pre-stored or acquired from the digital phase modulation and demodulation module 105. The phase modulator 1013 may be further configured to perform a compensation and locking on a phase of each of the sub-beams according to the detected phase difference between each of the sub-beams and the reference beam.

The fiber laser light amplifier module 102 is connected to the modulator module 101 and configured to perform a power amplification on the plurality of sub-beams after the modulation. The fiber laser light amplifier module 102 may adopt an all-fiber amplifier array or other type of laser light power amplifier, wherein an all-fiber amplifier array is separately provided for each of the sub-beams, and further, the all-fiber amplifier array may have one or more stages to realize a one-stage or multi-stage power amplification on the sub-beams, so as to meet the requirements of the output power of the combined beam.

The laser light collimation emission module 103 is configured to collimate and output the reference beam after the frequency shift and each of the sub-beams after the power amplification. Specifically, the laser light collimation emission module 103 may be connected to the fiber laser light amplifier module 102 and the acousto-optic modulator 1012 in the modulator module 101 through optical fibers.

In some embodiments, the laser light collimation emission module 103 may comprise a collimator 1032 and a fiber end cap 1031, wherein the collimator 1032 may be configured to collimate and output each of the power-amplified sub-beams, and the fiber end cap 1031 may be configured to collimate and output the frequency-shifted reference beam.

The combination sampling module 104 is connected to the laser light collimation emission module 103, and configured to perform a coherent combination of all of the sub-beams and the reference beam which are collimated and outputted, and convert signal light obtained by the coherent combination into an electrical signal.

Specifically, in some embodiments, the combination sampling module 104 may comprise a spectroscope 1041, a sampling focusing mirror 1042, an attenuation component 1043 and a photodetector 1044, wherein the spectroscope 1041 may be configured to receive all of the sub-beams and the reference beam which are collimated and outputted, take one from all of the sub-beams for an interference combination with the reference beam; the sampling focusing mirror 1042 is provided at one side of the spectroscope and may be configured to focus an interference-combined beam; the attenuation component 1043 may be configured to attenuate power of the focused beam to be less than a detection threshold of the photodetector 1044, so that the focused beam can be detected; and the photodetector 1044 is configured to convert the power-attenuated beam into an electrical signal.

In some other embodiments, the spectroscope 1041 may also be configured to take another one from all of the sub-beams which are collimated and outputted, for a laser power detection. The digital phase modulation and demodulation module 105 is connected to the combination sampling module 104 and the modulator module 101, respectively, and may be configured to receive the electrical signal detected by the photodetector 1044, perform a phase demodulation on the electrical signal detected by the photodetector 1044 according to the set frequency for modulating the reference beam and each of the pseudo-random sequences, obtain a phase difference between each of the sub-beams and the reference beam, and output a phase compensation control signal. The modulator module 101 may be further configured to perform a phase compensation and locking on each of the sub-beams according to the phase compensation control signal, so that a coherence enhancement occurs during the coherent combination of all of the sub-beams in the combination sampling module.

In an embodiment of the present disclosure, on the basis that the modulator module 101 modulates each of the sub-beams with the pseudo-random sequence, after receiving the electrical signal, the digital phase modulation and demodulation module 105 may demodulate the electrical signals collected by the photodetector 1044 according to each of the pseudo-random sequences, and calculate the phase difference between each of the sub-beams and the reference beam through one-time detection. Specifically, There is a correlation coefficient $$\rho(X, Y) = \frac{1}{n}\sum_{i=1}^{n} x_i y_i = 0$$

for two mutually orthogonal pseudo-random sequences $X(x_1, x_2, x_3 \ldots x_n)$ and $Y(y_1, y_2, y_3 \ldots y_n)$, that is, in a period of corresponding pseudo-random sequence, a sum of products of corresponding items in the pseudo-random sequence X and the pseudo-random sequence Y is 0.

After the modulator module 101 modulates the sub-beams with the mutually orthogonal pseudo-random sequences, the electrical signals collected by the photodetector 1044 include the electrical signals obtained by converting the sub-beams and the reference beam.

After the frequency shift signal of the reference beam is filtered out of the electrical signal according to the set frequency, the resultant electrical signal is multiplied by the pseudo-random sequence corresponding to each of the sub-beams, and the multiplication result corresponding to each of the sub-beams is summed in one period of the corresponding pseudo-random sequence, and the signals of the remaining sub-beams are eliminated by the property that the correlation coefficient is 0 when the pseudo-random sequences are orthogonal to each other; a summation result corresponding to each of the sub-beams is normalized to obtain a cosine value of a phase difference between the corresponding sub-beam and the reference beam; an arc cosine is calculated for the cosine value of the phase difference between each of the sub-beams and the reference beam to obtain the phase difference between the corresponding sub-beam and the reference beam.

For example, in an embodiment of the present disclosure, the modulator module 101 generates or acquires a plurality of pseudo-random sequences of a same number as the sub-beams, and modulates each of the sub-beams with a corresponding pseudo-random sequence, wherein the pseudo-random sequences are orthogonally independent from each other, and a 2m-th item and a (2m−1)-th item in each of the pseudo-random sequences have different values, wherein m is a positive integer. In some embodiments, in order to obtain a better detection result, it may be set that an average value of the items in each of the pseudo-random sequences is 0.5, each of the pseudo-random sequences is an integer sequence, and each of the pseudo-random sequences has an equal variance.

The modulated sub-beams pass through the laser light collimation emission module 103 to form a combined beam, which interferes with the reference beam, then an electrical signal is detected by the photodetector 1044, and a frequency shift signal of the reference beam in the electrical signal is filtered out for further demodulation.

In this embodiment, for example, it is assumed that I(t) is a light intensity of each of the sub-beams at timing t, $\varphi_m$ is a phase of the reference beam, $\varphi_k$ is a phase of a k-th sub-beam, $\delta_k$ is a pseudo-random sequence corresponding to the k-th sub-beam, and N is the number of the sub-beams, then a signal V(t) obtained by demodulating the electrical signal detected by the photodetector 1044 and removing a beat frequency may be expressed as:

$$V(t) = I(t)\left[\cos[\varphi_m(t)] + \sum_{k=1}^{N}\cos[\varphi_k(t) + \delta_k(t)\cdot\pi]\right]^2 \quad (1)$$

When the phase difference between a certain sub-beam and the reference beam is calculated, the signal V(t) is multiplied by a pseudo-random sequence corresponding to the sub-beam for summarization/integration within a pseudo-random sequence period T, which may be expressed as:

$$\int_T V(t)\cos[\pi\cdot\delta_k(t)]dt = \quad (2)$$

$$\int_T I(t)\left[\cos[\varphi_m(t)] + \sum_{k=1}^{N}\cos[\varphi_k(t) + \delta_k(t)\cdot\pi]\right]^2 \cos[\pi\cdot\delta_k(t)]dt$$

Since the pseudo-random sequences corresponding to the sub-beams are orthogonally independent from each other, after the integration, formula (2) only contains information on the phase $\varphi_m$ of the reference beam and the phase $\varphi_k$ of the k-th sub-beam; and after the light intensity of the k-th sub-beam is normalized, the following formula is obtained:

$$\int_T V(t)\cos[\pi\cdot\delta_k(t)]dt = I\cdot\cos(\varphi_m-\varphi_k) \quad (3)$$

After the light intensity is further extracted, the phase difference between the k-th sub-beam and the reference beam can be obtained by calculating the arc cosine.

It can be seen that in the fiber laser light coherent combination system according to the embodiment of the present invention, in a procedure of detecting the phase difference between each of the sub-beams and the reference beam by the heterodyne method, the sub-beams are modulated in conjunction with the pseudo-random sequences, and then the electrical signals generated by the combined beam are demodulated in conjunction with the corresponding pseudo-random sequences, thereby detecting the phase difference between each of the sub-beams and the reference beam through only one photodetector and demodulation circuit, which overcomes the problem of the need to configure photodetectors and demodulation circuits for the sub-beams respectively when the heterodyne method is adopted to detect the phase difference between each of the sub-beams and the reference beam in the existing multi-path active phase-locked coherent combination technology, and greatly simplifies the device structure.

In order that those skilled in the art can better understand the present disclosure, the embodiments of the present disclosure will be explained with specific examples below.

Figure 2:
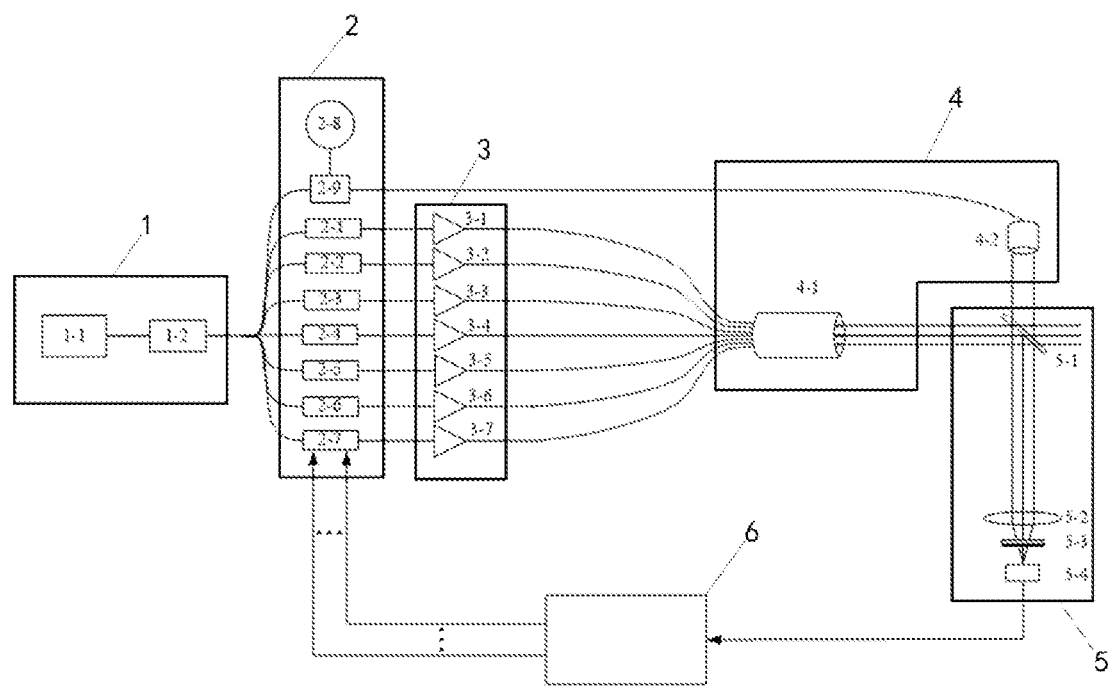
FIG. 2 is a schematic structural diagram of a fiber laser light coherent combination system according to another embodiment of the present disclosure.

FIG. 2 is a schematic structural diagram of a fiber laser light coherent combination system according to another embodiment of the present disclosure. Referring to FIG. 2, the fiber laser light coherent combination system may comprise seven sub-beams, and may comprise a laser light seed source module 1, a modulator module 2, a fiber laser light amplifier module 3, a laser light collimation emission module 4, a combination sampling module 5 and a digital phase modulation and demodulation module 6.

The laser light seed source module 1 may comprise a seed source 1-1, and an fiber beam splitter 1-2 that may be a 1 to 8 fiber beam splitter, i.e., a beam outputted from the seed source 1-1 is split into eight beams after entering the fiber beam splitter 1-2. The modulator module 2 may comprise a first electro-optic phase modulator 2-1, a second electro-optic phase modulator 2-2, a third electro-optic phase modulator 2-3, a fourth electro-optic phase modulator 2-4, a fifth electro-optic phase modulator 2-5, a sixth electro-optic phase modulator 2-6, a seventh electro-optic phase modulator 2-7, a signal source 2-8 and an acousto-optic phase modulator 2-9. The fiber laser light amplifier module 3 comprises a first power amplifier 3-1, a second power amplifier 3-2, a third power amplifier 3-3, a fourth power amplifier 3-4, a fifth power amplifier 3-5, a sixth power amplifier 3-6 and a seventh power amplifier 3-7, which may be connected to the seven electro-optic phase modulators in the modulator module 2 in one-to-one correspondence. The laser light collimation emission module 4 may comprise a main beam collimation emitter 4-1 and a reference beam emission end cap 4-2. The combination sampling module 5 may comprise a spectroscope 5-1, a sampling focusing mirror 5-2, an attenuation component 5-3 and a photodetector 5-4. The digital phase modulation and demodulation module 6 may comprise seven control channels.

The laser light beam outputted by the seed source 1-1 enters the 1 to 8 fiber beam splitter 1-2 and is split into eight beams, which are divided into two groups, wherein a first group includes a laser light beam as a reference beam, and is injected into the acousto-optic phase modulator 2-9 for a frequency shift process according to the control signal of the signal source 2-8; a second group includes seven laser light beams as sub-beams, which are injected into an electro-optic phase modulator array (including seven electro-optic phase modulators 2-1, 2-2, 2-3, 2-4, 2-5, 2-6 and 2-7), and the sub-beams are modulated with seven pseudo-random sequences orthogonally independent from each other, respectively, wherein a 2m-th item and a (2m−1)-th item in each of the pseudo-random sequences have different values, and wherein m is a positive integer. After passing through the electro-optic phase modulator array, the second group of beams are injected into the fiber laser light amplifier module 3 (including seven power amplifiers 3-1, 3-2, 3-3, 3-4, 3-5, 3-6 and 3-7, with unlimited stages). Each of the sub-beams amplified by the fiber laser light amplifier module 3 is outputted to the main beam collimation emitter 4-1, and the reference beam passing through the acousto-optic phase modulator 2-9 is outputted to the reference beam emission end cap 4-2. The combined beam composed of the sub-beams is incident onto the spectroscope 5-1 and then split into two beams, wherein one beam is converged by the sampling focusing mirror 5-2, and incident onto the photodetector 5-4 after a power attenuation by the attenuation component 5-3; the photodetector 5-4 converts the received optical signal into an electrical signal and inputs it to the digital phase modulation and demodulation module 6 for demodulation to calculate the phase difference between each of the sub-beams and the reference beam; and the other beam is monitored for laser light power by a laser power detection device.

Figure 3:
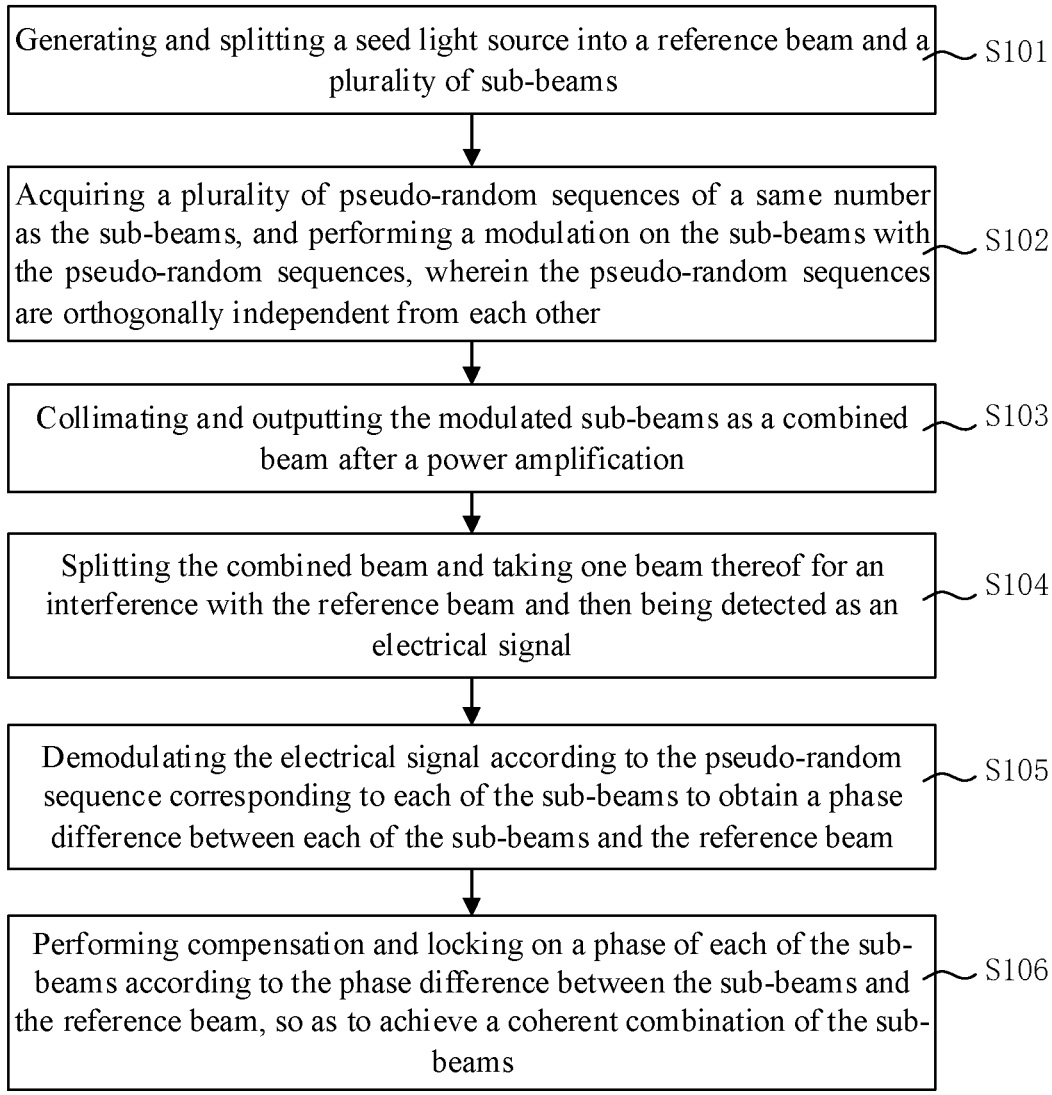
FIG. 3 is a schematic flowchart of a fiber laser light coherent combination method according to an embodiment of the present disclosure.

Based on the same invention concept as the fiber laser light coherent combination system described in the above embodiments, the present disclosure further provides a fiber laser light coherent combination method, as illustrated in FIG. 3, which may comprise steps S101 to S106:

S101: generating and splitting a seed light source into a reference beam and a plurality of sub-beams.

In order to realize coherent combination of a plurality of sub-beams by a multi-path active phase locking, the seed light source is split into N beams, wherein one beam is taken as a reference beam and the remaining N−1 beams are taken as sub-beams, and wherein the reference beam serves as a reference to calculate a phase difference, and the sub-beams are used for coherent combination after a power amplification.

S102: acquiring a plurality of pseudo-random sequences of a same number as the sub-beams, and performing a modulation on the sub-beams with the pseudo-random sequences in a one-to-one correspondence, wherein the pseudo-random sequence are orthogonally independent from each other, and a 2m-th item and a (2m−1)-th item in each of the pseudo-random sequences have different values, wherein m is a positive integer.

In order to overcome the defect in the prior art that the heterodyne method needs to configure photodetectors and demodulation circuits for the sub-beams, respectively, to detect the phase difference with the reference beam, before the detection, N−1 pseudo-random sequences of a same number as the sub-beams may be generated or acquired in advance to modulate the sub-beams in a one-to-one correspondence.

In some embodiments, in order to improve the demodulation effect, it may be further set that the each of pseudo-random sequences has an equal variance, and each of the pseudo-random sequences is an integer sequence and has an average value of 0.5, so as to suppress and eliminate the signals of other sub-beams by using the orthogonal relationship between the pseudo-random sequences in a subsequent frequency division demodulation procedure of a certain sub-beam, thereby detecting that sub-beam.

S103: collimating and outputting the modulated sub-beams as a combined beam after a power amplification.

One-stage or multi-stage power amplification is performed on each of the sub-beams by the fiber amplifier, so that each of the laser light outputs the required output power. It should be noted that due to different phases, no coherent enhancement has occurred in the power-amplified sub-beams outputted in step S103.

Step S104: splitting the combined beam, and taking one beam thereof for an interference with the reference beam and then being detected as an electrical signal.

Step S105: demodulating the electrical signal according to the pseudo-random sequence corresponding to each of the sub-beams to obtain a phase difference between each of the sub-beams and the reference beam.

Specifically, in an embodiment of the present disclosure, demodulating the electrical signal according to each of the pseudo-random sequences to obtain a phase difference between each of the sub-beams and the reference beam comprises: filtering out a frequency shift signal of the reference beam, multiplying the electrical signal by a pseudo-random sequence corresponding to a certain sub-beam, and summing in one period of the corresponding pseudo-random sequence to eliminate the signals of other sub-beams; normalizing and extracting a light intensity of the sub-beam to obtain a cosine value of a phase difference between the sub-beam and the reference beam; calculating an arc cosine for the cosine value of the phase difference between the sub-beam and the reference beam to obtain the phase difference between the sub-beam and the reference beam.

In this embodiment, in a modulation procedure of the sub-beams, since the pseudo-random sequences are orthogonal to each other, the electrical signal is multiplied by a pseudo-random sequence corresponding to a certain sub-beam to eliminate the influence of the signals of other sub-beams.

With reference to the frequency division demodulation procedure shown in formulas (1) to (3), when the phase difference between the k-th sub-beam and the reference beam is calculated, the electrical signal of the combined beam detected by the photodetector is multiplied by the pseudo-random sequence $\delta_k$ corresponding to the k-th sub-beam, and summed in a period of the corresponding pseudo-random sequence. Due to the property that the pseudo-random sequences are orthogonal to each other, the signals of other sub-beams can be suppressed and eliminated. The final result is only related to the cosine value of the phase difference $(\varphi_m-\varphi_k)$ between the k-th sub-beam and the reference beam, and $(\varphi_m-\varphi_k)$ can be obtained by calculating the arc cosine.

In some embodiments, after step S105, i.e., after calculating the arc cosine for the cosine value of the phase difference between the sub-beam and the reference beam to obtain the phase difference between the sub-beam and the reference beam, the fiber laser light coherent combination method further comprises S201 to S202:

S201: acquiring a half-wave voltage of a phase modulator corresponding to each of the sub-beams, and calculating a corresponding regulation voltage in conjunction with the phase difference between each of the sub-beams and the reference beam, respectively.

S202: performing a phase compensation and locking on each of the sub-beams by each of the phase modulators with reference to the corresponding regulation voltage.

In S201 to S202, the half-wave voltage is a voltage to be added when the phase modulator regulates the phase of the laser light beam for π. In actual applications, even for the phase modulators of the same model, corresponding half-wave voltages are not totally the same due to a hardware difference.

Therefore, in the phase modulation procedure of each of the sub-beams, it is necessary to first obtain the half-wave voltage of the phase modulator corresponding to each of the sub-beams. Specifically, the half-wave voltage may be detected by measurement before each modulation, or a pre-calibrated half-wave voltage may be read directly.

The regulation voltage of the phase modulator corresponding to each of the sub-beams is calculated in conjunction with the half-wave voltage of the phase modulator corresponding to each of the sub-beams and the phase difference between each of the sub-beams and the reference beam. By adding the corresponding voltage, the phase compensation for each of the sub-beams is achieved.

Step S106: performing compensation and locking on the phase of each of the sub-beams according to the phase difference between the sub-beam and the reference beam, so as to achieve the coherent combination of the sub-beams.

To sum up, the fiber laser light coherent combination system according to the embodiment of the present disclosure improves the multi-path active phase-locked coherent combination technology that adopts the heterodyne method, wherein in the procedure of detecting the phase difference between each of the sub-beams and the reference beam, the sub-beams are modulated with a plurality of pseudo-random sequences respectively before detection; in the demodulation procedure, the electric signal of the combined beam detected by the photodetector is multiplied by each of the sub-beams for frequency division demodulation, so as to suppress and eliminate the influence of other sub-beams when the phase difference between one sub-beam and the reference beam is calculated. According to the embodiment of the present disclosure, the phase difference between a plurality of the sub-beams and the reference beam can be calculated only by detecting the electrical signal of the combined beam once, thereby solving the problem in the prior art that the heterodyne method needs to configure photodetectors and demodulation circuits for the plurality of sub-beams respectively, which greatly simplifies the device structure, and reduces the device cost. Meanwhile, it avoids the inconsistency between calculation standards for the phase difference caused by the precision difference between the detection devices during multi-path detection, achieves a more accurate phase compensation for the sub-beams, and improves the effect of coherent combination.

Those of ordinary skill in the art can realize that the exemplary units and methodical steps described in conjunction with the embodiments disclosed herein are implementable in hardware, software or a combination thereof. Whether these functions are implemented in hardware or software depends on the specific applications and the design constraints of the technical solution. Professionals can adopt different methods to implement the described functions for each of the specific applications, but such implementation should not be considered as going beyond the scope of the present disclosure.

Software can be placed in a random-access memory (RAM), an internal storage, a read-only memory (ROM), an electrically programmable ROM, an electrically erasable and programmable ROM, a register, hard disk, a removable magnetic disk, a CD-ROM, or any other form of storage medium known in the technical field.

The above-described embodiments are all exemplary, rather than limitations to the present disclosure. Those skilled in the art can conceive of various variations and modifications according to the spirit of the present disclosure, and these variations and modifications are also within the protection scope of the present disclosure.

The invention claimed is:

1. A fiber laser light coherent combination system, comprising:
   a modulator module configured to receive a plurality of sub-beams and a reference beam split from a beam, perform a phase modulation on corresponding sub-beams according to pseudo-random sequences, and perform a frequency shift on the reference beam according to a set frequency, wherein each of the sub-beams is corresponding to one of the pseudo-random sequences, the pseudo-random sequences are orthogonally independent from each other, and a 2m-th item and a (2m−1)-th item in each of the pseudo-random sequences have different values, wherein m is a positive integer;
   a fiber laser light amplifier module configured to perform a power amplification on the plurality of sub-beams after the phase modulation;
   a laser light collimation emission module configured to collimate and output the reference beam after the frequency shift and the plurality of sub-beams after the power amplification;
   a combination sampling module configured to perform a coherent combination of all of the sub-beams and the reference beam which are collimated and outputted, and convert signal light obtained by the coherent combination into an electrical signal; and
   a digital phase modulation and demodulation module configured to receive the electrical signal, perform a phase demodulation on the electrical signal according to the set frequency and each of the pseudo-random sequences, obtain a phase difference between each of the sub-beams and the reference beam, and output a phase compensation control signal,
   wherein the modulator module is further configured to perform a phase compensation and locking on each of the sub-beams according to the phase compensation control signal, so that a coherence enhancement occurs during the coherent combination of all of the sub-beams in the combination sampling module;
   wherein the modulator module comprises:
      a signal source configured to generate a modulation signal of the set frequency;
      an acousto-optic modulator configured to perform a frequency shift on the reference beam according to the modulation signal; and
      a plurality of phase modulators configured to perform a phase modulation on the corresponding sub-beams according to the pseudo-random sequences, and perform phase locking on each of the sub-beams according to the phase compensation control signal.

2. The fiber laser light coherent combination system according to claim 1, wherein the phase modulator is an electro-optic phase modulator or an acousto-optic phase modulator.

3. The fiber laser light coherent combination system according to claim 1, wherein the digital phase modulation and demodulation module further comprises an FPGA digital control circuit configured to generate and output each of the pseudo-random sequences to the modulator module.

4. The fiber laser light coherent combination system according to claim 1, wherein the fiber laser light amplifier module comprises a plurality of fiber laser amplifiers each performing a power amplification on one of the sub-beams after the phase modulation.

5. The fiber laser light coherent combination system according to claim 1, wherein the combination sampling module comprises:
   a spectroscope configured to receive all of the sub-beams and the reference beam which are collimated and outputted, and take one of the sub-beams for an interference combination with the reference beam;
   a sampling focusing mirror provided at one side of the spectroscope and configured to focus an interference-combined beam;
   an attenuation component configured to attenuate power of the focused beam to be less than a detection threshold of the photodetector; and
   the photodetector configured to convert the power-attenuated beam into an electrical signal.

6. The fiber laser light coherent combination system according to claim 5, wherein the spectroscope is further configured to take another one from all of the sub-beams which are collimated and outputted for a laser power detection.

7. The fiber laser light coherent combination system according to claim 1, wherein the laser light collimation emission module comprises:
   a collimator configured to collimate and output each of the sub-beams after the power amplification; and
   a fiber end cap configured to collimate and output the reference beam after the frequency shift.

8. The fiber laser light coherent combination system according to claim 1, wherein the digital phase modulation and demodulation module is configured to filter out a frequency shift signal of the reference beam in the electrical signal according to the set frequency, multiply the resultant electrical signal by a pseudo-random sequence corresponding to each of the sub-beams, sum a multiplication result corresponding to each of the sub-beams within a period of the corresponding pseudo-random sequence, normalize a summation result corresponding to each of the sub-beams to obtain a cosine value of the phase difference between the corresponding sub-beam and the reference beam, and calculate an arc cosine of the cosine value of the phase difference between each of the sub-beams and the reference beam to obtain the phase difference between the corresponding sub-beam and the reference beam.

9. The fiber laser light coherent combination system according to claim 1, further comprising a laser light seed source module; and the laser light seed source module comprises:
    a laser light seed source configured to generate a laser light beam; and
    a fiber beam splitter configured to split the laser light beam into the plurality of sub-beams and the one reference beam.

\* \* \* \* \*